United States Patent [19]
Setogawa et al.

[11] Patent Number: 5,137,123
[45] Date of Patent: Aug. 11, 1992

[54] BRAKE DISK

[75] Inventors: Tamotsu Setogawa; Takahiro Hachigoh; Takehiko Masuda, all of Wako, Japan

[73] Assignee: Honda Giken Kogyo Kabushiki Kaisha, Tokyo, Japan

[21] Appl. No.: 661,022

[22] Filed: Feb. 26, 1991

[30] Foreign Application Priority Data

Jun. 5, 1990 [JP] Japan .................................. 1-59613[U]

[51] Int. Cl.$^5$ ...................... F16D 65/78; F16D 65/10; F16D 55/14; F16D 55/46
[52] U.S. Cl. ........................ 188/264 AA; 188/219.6; 188/218 R; 188/72.2
[58] Field of Search .............. 188/264 AA, 71.7, 71.8, 188/71.2, 71.4, 72.2, 73.1, 73.31, 264 AA, 71.7; 188/79, 78, 821.1, 206 R, 218 R, 219.6, 264 R

[56] References Cited

U.S. PATENT DOCUMENTS 4,620,616 11/1986 Martin .......................... 188/264 AA

*Primary Examiner*—Jesus D. Sotelo
*Assistant Examiner*—Kenneth Lee
*Attorney, Agent, or Firm*—Armstrong & Kubovcik

[57] ABSTRACT

A brake disk according to the present invention incorporates a large number of air ducts defined in a disk portion having opposite sides to be clamped between friction pads, with the air ducts extending radially through the disk portion, and a plurality of joining portions formed on a mounting flange portion at circumferential distances and joined to a wheel hub by bolts. The disk portion is formed so that the heat capacity thereof is larger in an area nearer to the joining portions and smaller in an area more remote from the joining portions. The distance between adjacent ones of a large number of partitions defining the air ducts can be smaller in a location nearer to the joining portions and larger in a location more remote from the joining portions. Alternatively, a large number of partitions defining the air ducts are formed so that the ones nearer to the joining portions are larger in wall thickness and the partitions more remote from the joining portions are smaller in wall thickness.

6 Claims, 3 Drawing Sheets

BRAKE DISK

BACKGROUND OF THE INVENTION

The present invention relates to a brake disk of the ventilated type which has a large number of air ducts defined in a disk portion having opposite sides clamped between friction pads with the air ducts extending radially through the disk portions, and a plurality of joining portions formed on a mounting flange portion at circumferentially spaced apart distances and joined to a wheel hub by bolts.

A brake disk of such type is already known, for example, as disclosed in Japanese Patent Application Laid-Open No. 156736/83.

In such a brake disk, if a strain is produced in the disk portion by frictional heat due to the contact of the disk portion by the friction pads, a phenomenon known as "judder" is generated so that the friction pads are oscillated from the disk portion during braking. This may cause the braking feeling to be degraded.

The present inventors have cleared up the following matter as one factor of the thermal strain of the disk portion: When the disk portion has been heated by frictional heat, that area of the disk portion which is nearer to the joining portions to the wheel hub is subjected to the transfer of the heat through the joining portions to the wheel hub, in addition to the cooling by the air flowing through air ducts. Hence, such an area is better cooled than an area farther away from the joining portions. Thus, a large difference in temperature is produced between the areas of the disk portion nearer to and more remote from the joining portions. This causes a thermal strain.

OBJECT AND SUMMARY OF THE INVENTION

Accordingly, it is an object of the present invention to provide a brake disk of the above-described type, wherein the cooling effect for the disk portion is evenly provided in the entire area thereof, which reduces the possibility of thermal strain.

To achieve the above object, the invention provides a disk portion of the brake disk formed so that the heat capacity thereof is larger in an area nearer to the joining portions and smaller in an area more remote from the joining portions.

In order to set the heat capacity of the disk portion in the above-described manner, it is preferred for practical purposes that the distance of adjacent ones of a large number of partitions defining the large number of air ducts in the disk portion to a location nearer to the joining portions is smaller than in other locations, and that among the partitions, the wall thickness of those nearer to the joining portions is greater than that of the other partitions.

With the above construction, the cooling effect is even or more uniform among the areas of the disk portion nearer to and more remote from the joining portions, so that any large difference in temperature is not produced between the different areas. This ensures that a thermal strain of the disk portion ca be prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

One embodiment of the present invention will now be described with reference to the accompanying drawings.

Figure 1:
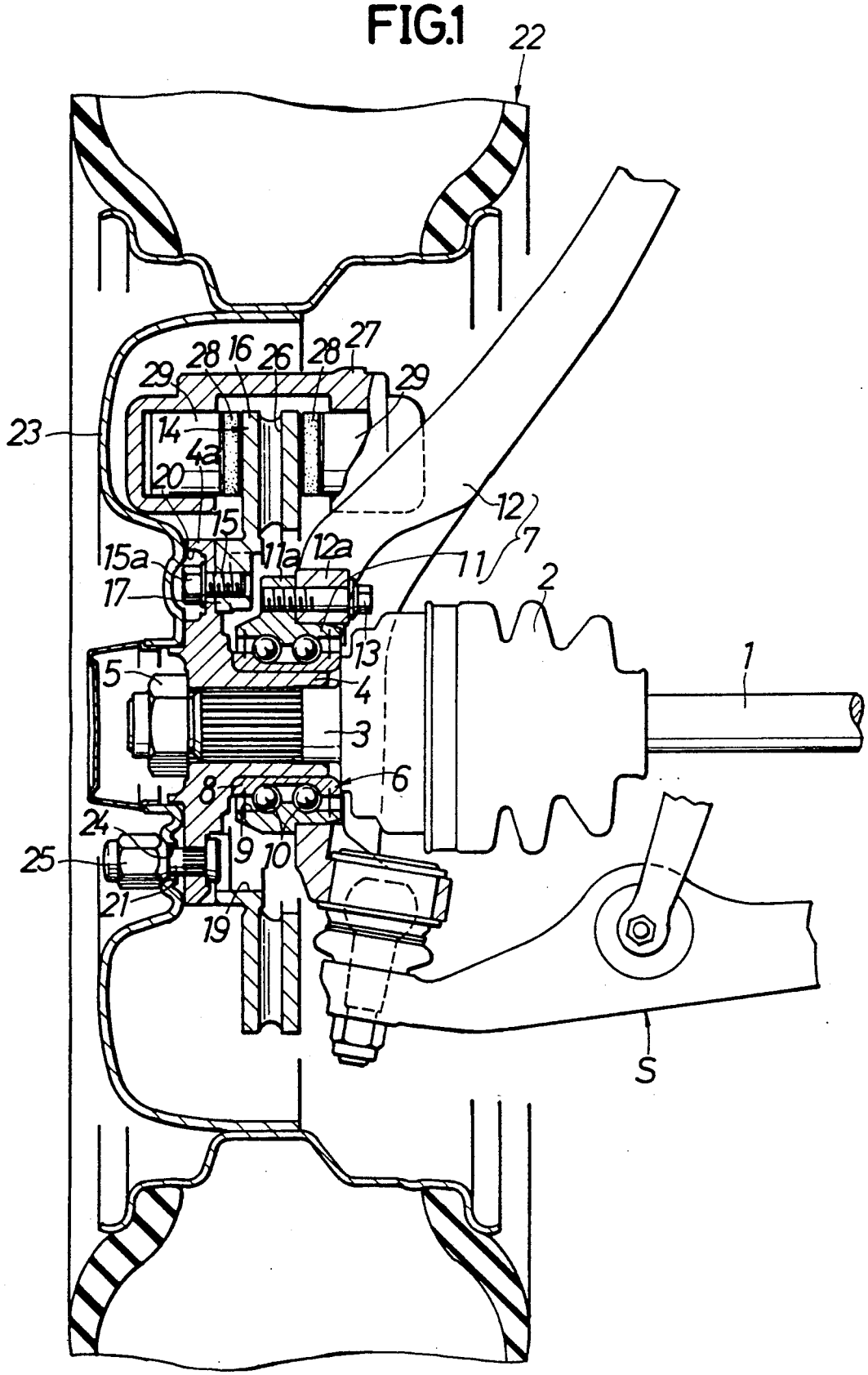
FIG. 1 is a longitudinal sectional back view of a left wheel portion of an automobile equipped with a brake disk according to one embodiment of the present invention.

FIG. 1 is a longitudinal sectional back view of a mounting structure for a front wheel and a brake disk, particularly for a left side, in a front engine and front drive type automobile. A structure for a right side is symmetrical to that for the left side and hence, the illustration thereof is omitted.

An drive spindle 3 is connected through a constant velocity joint 2 to an outer end of a wheel driving shaft 1 driven from a power unit which is not shown. A wheel hub 4 is spline-fitted over the spindle 3 and secured thereto by a nut 5.

An outer peripheral surface of the wheel hub 4 is rotatably carried on a knuckle 7 through a bearing 6.

The bearing 6 includes an inner race 8 press-fitted over the outer peripheral surface of the wheel hub 4, an outer race 9 surrounding the inner race 8, and a large number of balls 10 interposed between the races 8 and 9.

Figure 2:
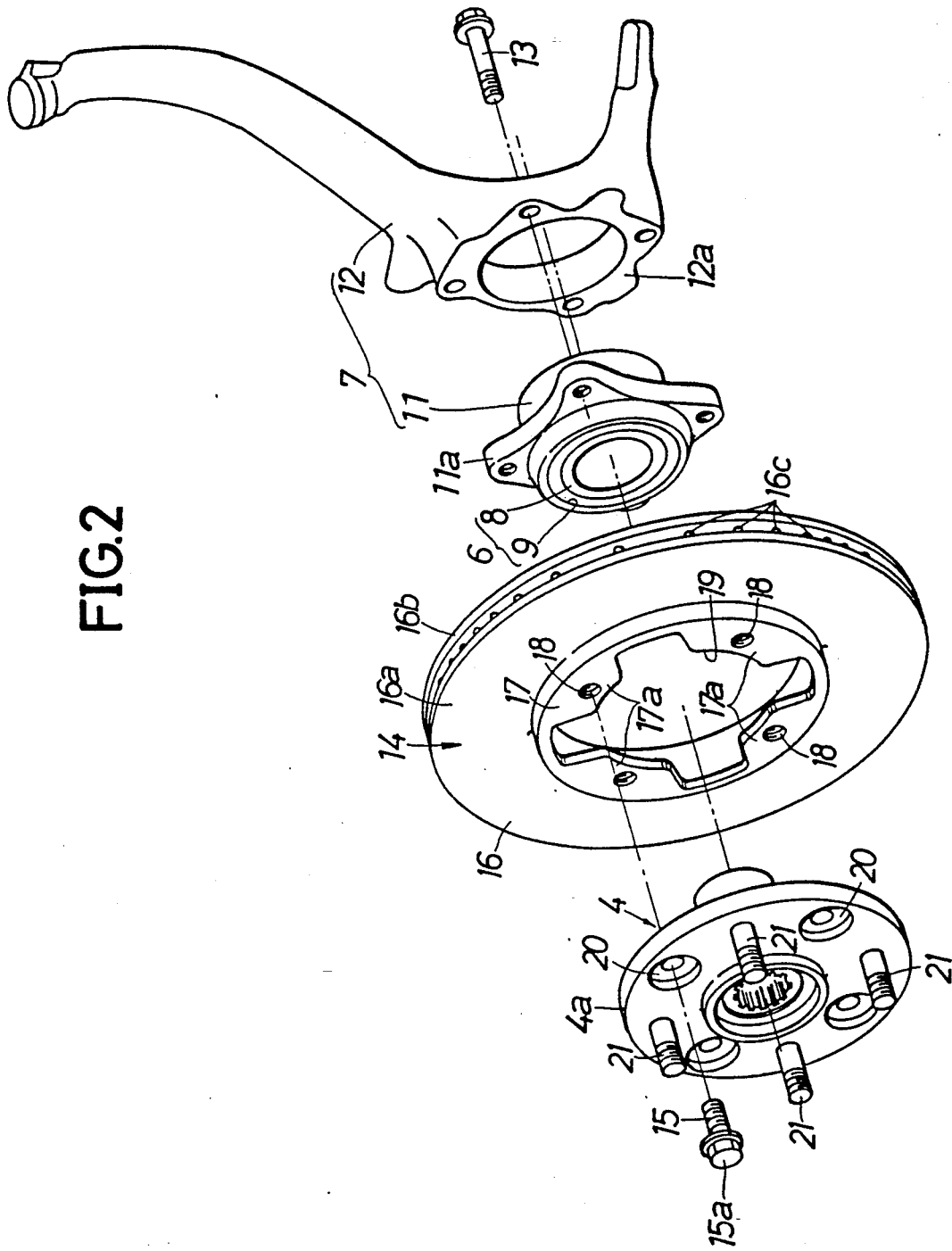
FIG. 2 is an exploded perspective view of an essential portion of the left wheel portion.

As shown in FIGS. 1 and 2, the knuckle 7 is divided into two parts: a hub holder 11 integral with the outer race 9 and an arm assembly 12 connected to a known suspension S and a steering mechanism (not shown). A boss 12a of the arm assembly 12 is fitted over an outer periphery of the hub holder 11 and secured to a flange 11a formed around an outer periphery of an outer end of the hub holder 11 by four bolts 13.

The flange 11a of the hub holder 11 has a star-like shape with portions threadedly engaged by the four bolts projecting radially outwardly.

At an outer periphery of its outer end, the wheel hub 4 is integrally provided with a flange 4a. A brake disk 14 according to this embodiment is secured to an inner surface of the flange 4a by four bolts 15.

The brake disk 14 comprises an annular disk portion 16 and a mounting flange portion 17 connected to an inner periphery of the disk portion 16. The mounting flange portion 17 includes four joining portions 17a having threaded bores 18 for threaded engagement by the four bolts 15 and defines an internal hole 19 of a star-like shape by the joining portions 17a projecting radially inwardly at circumferentially equally spaced apart distances, so that the internal hole 19 so defined corresponds to a profile of the flange 11a of the hub holder 11. The internal hole 19 is sized so that the flange 11a can be passed through the hole 19.

A head 15a of the bolt 15 is received in a recess 20 defined in an outer surface of the flange 4a of the wheel hub 4.

Four bolts 21 are embedded in the flange 4a of the wheel hub 4 with their shanks projecting from the outer surface of the flange 4a. The bolts 21 are adapted to be passed through mounting holes 24 in a wheel disk 23 of a wheel 22 overlapped on the outer surface of the flange 4a, so that the wheel 22 can be secured to the wheel hub 4 by threadedly clamping wheel nuts 25 over projecting ends of the bolts 21, respectively.

In this manner, the wheel disk 23 and the brake disk 14 are independently coupled to the outer and inner surfaces of the flange 4a of the wheel hub 4 by the bolts 21 and the wheel nuts 25 as well as the bolts 15, respectively. Therefore, a clamping force of the wheel nuts 25 on the wheel disk 23 has no influence on and is independent of the brake disk 14. Thus, the wheel 22 can be firmly attached to the wheel hub 4 with a strong clamping force.

On the other hand, a clamping force of the bolts 15 on the brake disk 14 can be set at a level optimal for mounting of the brake disk 14, without taking the wheel disk 23 into special consideration. This makes possible the suppressing of the strain on the brake disk 14 down to a substantially negligible level.

In detaching the brake disk 14, the bolts 13 are first removed to separate the arm assembly 12 from the hub holder 11 In doing so, the hub holder 11 can be passed through the internal hole 19 in the brake disk 14, so that the brake disk 14 can be detached from the inner surface of the flange 4a of the wheel hub 4 without any obstruction by the knuckle 7. Therefore, the entire knuckle 7 need not be withdrawn from the wheel hub 4 along with the bearing 6 and hence, the operation of detaching the brake disk 14 is extremely easy. Moreover, in this operation, there is no fear of breaking of the bearing, which enables a continuous use.

Figure 3:
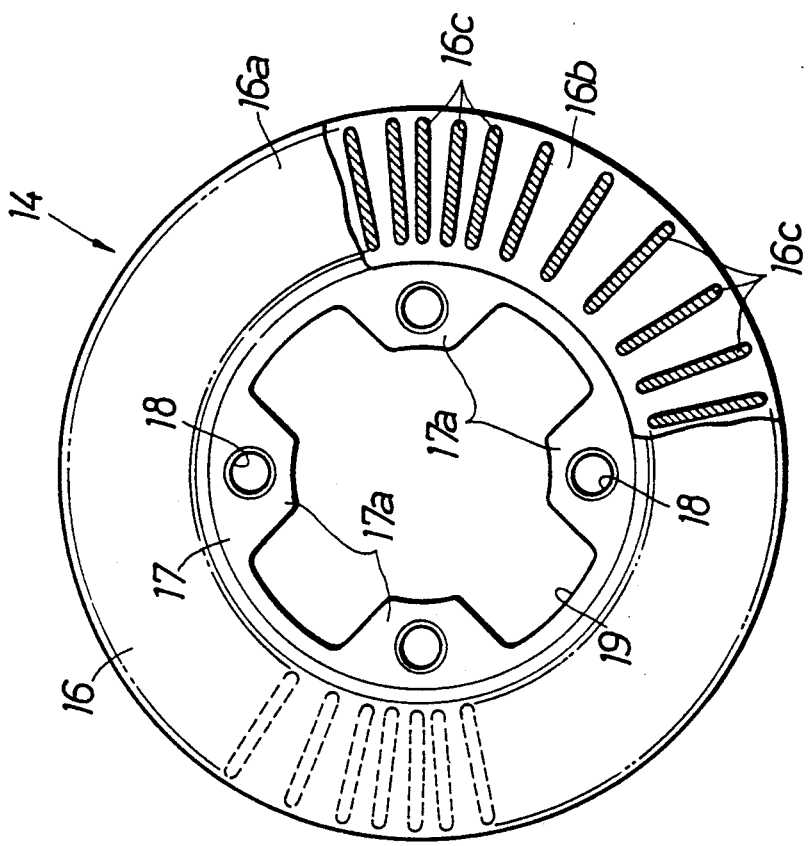
FIG. 3 is a front view in cross section of a portion of the brake disk.

Referring to FIGS. 1 and 3, the disk portion 16 of the brake disk 14 includes a pair of left and right friction walls 16a and 16b opposed to each other at a given distance.

The friction walls 16a and 16b are integrally interconnected through a large number of partitions 16c arranged radially. A large number of air ducts 26 extending radially through the disk portion 16 are defined by the partitions 16c between the friction walls 16a and 16b.

The partitions 16c are arranged at narrower distances circumferentially from each other at a location nearer to the joining portions 17a and at wider distances in a location more remote from the joining portions 17a, so that the heat capacity of the disk portion 16 is larger in an area nearer to the joining portions 17a and smaller in an area more remote from the joining portions 17a.

Figure 4:
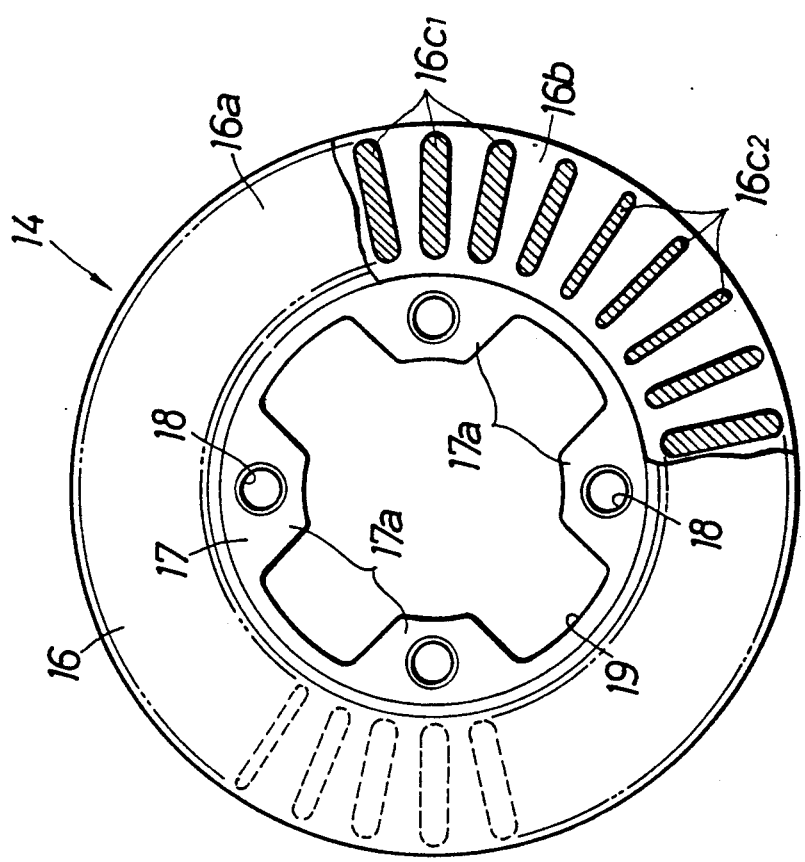
FIG. 4 is a front view similar to FIG. 3, but illustrating a modification of the brake disk.

A similar setting of the heat capacity is possible, if the wall thicknesses of the partitions $16c_1$ nearer to the joining portions 17a are made thicker, while the wall thicknesses of the partitions $16c_2$ remote from the joining portions 17a are made thinner, such as in a modification of a disk brake 14 shown in FIG. 4.

In the illustrated embodiments, it is desirable that all of the partitions 16c, $16c_1$ and $16c_2$ have the same length in order to provide stable rigidity to each of the friction walls 16a and 16b.

A brake caliper 27 is attached to the arm assembly 12. The brake caliper 27 is provided with a pair of left and right pads 28 opposed to each other with the disk portion 16 interposed therebetween and a pair of hydraulically operated pistons 29 for bringing the friction pads 28 into press contact with the friction walls 16a and 16b.

The operation of the embodiment will be described below.

If the pistons 29 are operated to bring the left and right friction pads 28 into press contact with the friction walls 16a and 16b of the brake disk 14 when the automobile is travelling, braking torque is applied to the wheel 22 through the brake disk 14.

At this time, the disk portion 16 of the brake disk 14 is heated by friction, but the friction walls 16a and 16b and the partitions 16c are cooled by air flowing through the air ducts 26 from the inner peripheral side of the disk portion 16 toward the outer peripheral side thereof with rotation of the brake disk 14. A portion of the frictional heat is transferred through the joining portions 17a of the mounting flange portion 17 to the wheel hub 4 and to the wheel disk 23 and thus is dissipated. In this manner, the overheating of the disk portion 16 is prevented.

That area of the disk portion 16 which is nearer to the joining portions 17a is subject to the cooling by the air passing through the air ducts 26 and to the transfer of the heat from the joining portions 17a to the wheel hub 4. As a result, that area of the disk is high in coolability, as compared with an area more remote from the joining portions 17a. However, since the heat capacity of each area of the disk portion 16 is set in the above-described manner according to its coolability, the entire disk portion 16 is equally cooled, so that any large difference in temperature is not produced between the areas of the disk portion 16 which are nearer to and more remote from the joining portions 17a. This ensures that thermal strain of an the disk portion 16 can be prevented.

As described above, according to the present invention, the disk portion is formed so that the heat capacity is larger in the area nearer to the joining portions and smaller in the area more remote from the joining portions. Therefore, the cooling effect can be even over the entire disk portion to suppress the generation of any large difference in temperature. This ensures that the thermal strain of the disk portion can be prevented. Therefore, during braking, the "judder" phenomenon can be prevented from occurring, thereby providing a good braking feeling.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A brake disk comprising: a plurality of air ducts defined in a disk portion having opposite sides to be clamped between friction pads, said plurality of air ducts extending radially through the disk portion; and a plurality of joining portions formed on a mounting flange portion at circumferential distances and joined to a wheel hub by bolts, wherein said disk portion air ducts are spaced circumferentially around said disk portion to provide less air passage and greater heat capacity in areas of said disk portion nearer to said joining potions and greater air passage and less heat capacity in areas of said disk portion more remote from the joining portions.

2. A brake disk according to claim 1, wherein a distance between adjacent ones of a plurality of partitions defining the air ducts is smaller in a location nearer to the joining portions and larger in a location more remote from the joining portions.

3. A brake disk according to claim 1, wherein a plurality of partitions defining the air ducts are formed such that said plurality of partitions nearer to the joining portions are larger in wall thickness, and said plurality of partitions more remote from the joining portions are smaller in wall thickness.

4. A brake disk comprising:
  a disk portion having opposite sides clamped between friction pads;
  a plurality of air ducts defined between the opposite sides of said disk portion and radially extending through said disk portion, said plurality of air ducts being defined by a plurality of partitions;
  a mounting flange portion connected to an inner periphery of said disk portion; and
  a plurality of joining portions formed on said mounting flange portion at circumferentially spaced apart distances, the brake disk being mounted to a wheel hub through said plurality of joining portions by bolts, wherein
  said disk portion has first and second areas, the first areas being located nearer to said plurality of joining portions than said second areas, and
  the plurality of partitions defining said radially extending air ducts in said first areas of said disk portion are arranged to provide less air flow and greater heat capacity than the arrangement of the plurality of partitions defining said radially extending air ducts in said second areas.

5. A brake disk according to claim 4, wherein a distance between adjacent ones of the plurality of partitions defining the air ducts in the first areas is smaller than a distance between adjacent ones of the plurality of partitions in the second areas.

6. A brake disk according to claim 4, wherein adjacent ones of the plurality of partitions in the first areas are larger in wall thickness than adjacent ones of the plurality of partitions in the second areas.

* * * * *

UNITED STATES PATENT AND TRADEMARK OFFICE
CERTIFICATE OF CORRECTION

PATENT NO. : 5,137,123
DATED : August 11, 1992
INVENTOR(S) : Setogawa, et. al.

It is certified that error appears in the above-indentified patent and that said Letters Patent is hereby corrected as shown below:

On the Title page, item [30], second line "1-59613" should read --2-59613--.

Signed and Sealed this

Seventh Day of September, 1993

Attest:

BRUCE LEHMAN

*Attesting Officer*  *Commissioner of Patents and Trademarks*